(12) United States Patent
Moccand et al.

(10) Patent No.: US 11,096,401 B2
(45) Date of Patent: Aug. 24, 2021

(54) METHOD FOR PRODUCING ROAST COFFEE BEANS

(71) Applicant: SOCIETE DES PRODUITS NESTLE S.A., Vevey (CH)

(72) Inventors: Cyril Moccand, Lausanne (CH); Stefan Palzer, Lausanne (CH); Rachid Bel-Rhlid, Savigny (CH); Christoph Thomas Reh, Epalinges (CH); Jean-Luc Sauvageat, Epalinges (CH); Wilbert Sybesma, Munsingen (CH)

(73) Assignee: Societe des Produits Nestle S.A., Vevey (CH)

(*) Notice: Subject to any disclaimer, the term of this patent is extended or adjusted under 35 U.S.C. 154(b) by 0 days.

(21) Appl. No.: 16/652,762

(22) PCT Filed: Sep. 24, 2018

(86) PCT No.: PCT/EP2018/075822
§ 371 (c)(1),
(2) Date: Apr. 1, 2020

(87) PCT Pub. No.: WO2019/068497
PCT Pub. Date: Apr. 11, 2019

(65) Prior Publication Data
US 2020/0296988 A1    Sep. 24, 2020

(30) Foreign Application Priority Data

Oct. 4, 2017 (EP) ................................. 17194683

(51) Int. Cl.
*A23F 5/06* (2006.01)
*A23F 5/02* (2006.01)
*A23F 5/24* (2006.01)

(52) U.S. Cl.
CPC .............. *A23F 5/06* (2013.01); *A23F 5/02* (2013.01); *A23F 5/246* (2013.01)

(58) Field of Classification Search
CPC ............. A23F 5/02; A23F 5/06; A23F 5/246
See application file for complete search history.

(56) References Cited

U.S. PATENT DOCUMENTS

| | | | |
|---|---|---|---|
| 4,857,351 A | 8/1989 | Neilson et al. | |
| 4,904,484 A * | 2/1990 | Small | A23F 5/163 426/45 |
| 4,983,408 A * | 1/1991 | Colton | A23F 5/246 426/425 |
| 2011/0281013 A1* | 11/2011 | Silver | A23F 5/246 426/594 |

FOREIGN PATENT DOCUMENTS

| | | | |
|---|---|---|---|
| GB | 388699 | | 3/1933 |
| GB | 2500662 | | 10/2013 |
| JP | 2004121138 | * | 4/2004 |
| WO | 2016004949 | | 1/2016 |
| WO | 2017037216 | | 3/2017 |

OTHER PUBLICATIONS

English Translation for JP2004121138 published Apr. 2004.*

* cited by examiner

*Primary Examiner* — Anthony J Weier
(74) *Attorney, Agent, or Firm* — K&L Gates LLP

(57) ABSTRACT

The present invention relates to a method for producing roast coffee beans with improved aroma, wherein extracted roast coffee beans are treated with an aqueous liquid comprising glycosidase to hydrolyse carbohydrates in the coffee beans, and the aqueous solution is subsequently used to infuse green coffee beans before roasting.

15 Claims, 2 Drawing Sheets

METHOD FOR PRODUCING ROAST COFFEE BEANS

CROSS REFERENCE TO RELATED APPLICATIONS

The present application is a National Stage of International Application No. PCT/EP2018/075822, filed on Sep. 24, 2018, which claims priority to European Patent Application No. 17194683.3, filed on Oct. 4, 2017, the entire contents of which are being incorporated herein by reference.

FIELD OF THE INVENTION

The present invention relates to a method for producing roast coffee beans with improved aroma.

BACKGROUND

Coffee is a major ingredient in a number of beverages and food products, such as black coffee beverages, espresso, cappuccino, café latte and the like, wherein coffee imparts characteristic flavour and aroma to the product. The coffee is typically present as an extract of roast and ground coffee beans, the extract being prepared either immediately before consumption as for example in the traditional preparation by filter-drip-brewing, under pressure in an espresso machine, by extraction of roast and ground coffee in a capsule, e.g. in a Nespresso™ or Nescafe Dolce Gusto™ system, or the extract is prepared beforehand and packed as an RTD (Ready To Drink) coffee beverage or dried and distributed as a soluble coffee product which can be dissolved in water to produce a coffee beverage. The aroma and taste of coffee is a main characteristic of such products and critical for consumer appreciation of the product. The typical coffee aroma and taste can to a large extent be ascribed to taste and aroma compounds formed during roasting of the coffee beans. There is therefore a desire to be able to further improve aroma characteristic and intensity formed during roasting. Furthermore, there is a desire to further utilise the coffee material left after extraction of coffee, especially coffee grounds left after extraction for production of soluble coffee.

SUMMARY OF THE INVENTION

The inventors have found that an extract produced by treating already extracted roast and ground coffee beans with glycosidase can be infused into green coffee beans, and when the infused beans are subsequently roasted, the aroma and taste developed is superior in quality and/or intensity to the aroma and taste developed by similar non-infused beans. Desired aroma characteristics, often associated with *Arabica* coffee, such as e.g. floral, fruity and acidic notes, may have increased intensity, and/or undesired aroma characteristics, often associated with *Robusta* coffee, such as e.g. bitter, rubbery, earthy notes, may have decrease intensity compared to an untreated sample. Accordingly, the present invention relates to a method for producing roast coffee beans, the method comprising: a) extracting roast coffee beans with an aqueous liquid; b) separating the extracted roast coffee beans of step a) from the extract; c) mixing the separated extracted coffee beans of step b) with an aqueous liquid comprising glycosidase; d) separating the aqueous liquid and the extracted coffee beans from the mixture of step c), after the glycosidase has been allowed to react; e) infusing green coffee beans with the aqueous liquid obtained in step d); and f) roasting the infused green coffee beans obtained in step e).

DETAILED DESCRIPTION OF THE INVENTION

Definitions

Figure 1:
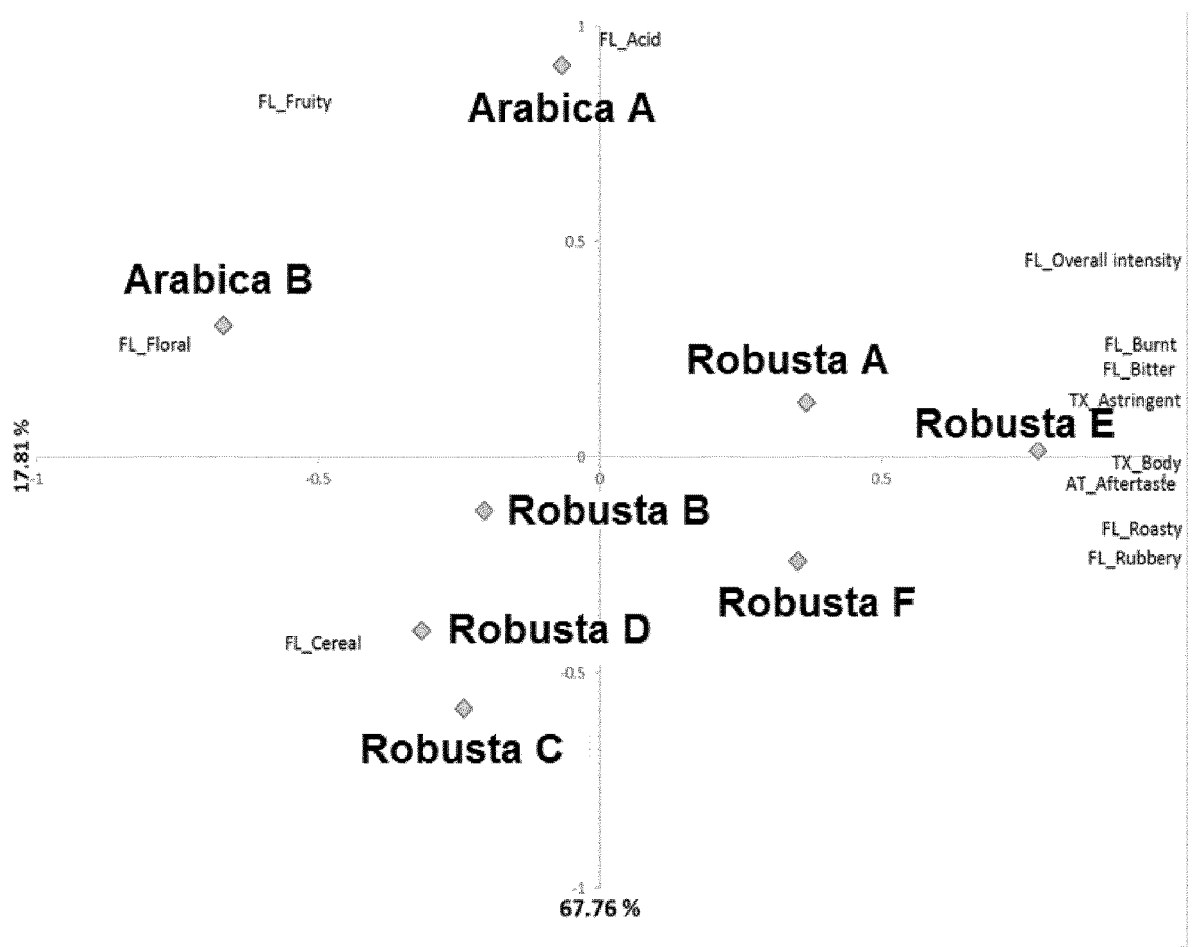
FIG. 1 shows Principal component analysis (PCA) of eight coffee samples (example 2), brewed on a filter at 50 g or Roast & Ground coffee per liter, at CTn 120 corresponding to light roasting. Arabica A: Unwashed *Arabica*, Brazilian origin, untreated. Arabica B: Unwashed *Arabica*, Brazilian origin, treated. Robusta A: High grade *Robusta*, Vietnam origin, untreated. Robusta B: High grade *Robusta*, Vietnam origin, treated. Robusta C: Medium grade *Robusta*, Vietnam origin, untreated. Robusta D: Medium grade *Robusta*, Vietnam origin, treated. Robusta F: Low grade *Robusta*, Vietnam origin, untreated. Robusta F: Low grade *Robusta*, Vietnam origin, treated. Twelve discriminant coffees attributes are represented in this scheme, including with flavors (FL) and aftertaste (AT). The treatment shifted the sensory attributes of all coffees towards more *Arabica*-like notes, including floral, fruity and acidic notes. Results are from example 2.

Coffee beans are the seeds of the coffee plant (*Coffea*), and coffee beans according to the present invention may be derived from any variety of coffee, e.g. *Arabica* coffee (*Coffea arabica*) or *Robusta* coffee (*Coffea canephora*). Coffee beans may be raw (so-called green coffee beans) or they may be roast. By roast coffee beans are meant coffee beans that have undergone a heat treatment to impart the typical flavour, aroma and colour of roast coffee.

By glycosidase is understood one or more enzymes with the ability to hydrolyse O- and S-glycosyl compounds, specifically any enzyme of EC classes 3.2.1.1-3.2.1.184. A glycosidase may have only glycosidase activity or may additionally have one or more side activities, i.e. other enzymatic activities in addition to glycosidase activity.

By cellulase is understood one or more enzymes with enzymatic activity of enzyme class EC 3.2.1.4 which catalyses the endohydrolysis of (1->4)-beta-D-glucosidic linkages in cellulose, hemicellulose, lichenin and cereal beta-D-glucans and may also hydrolyze 1, 4-linkages in beta-D-glucans also containing 1, 3-linkages. A cellulase may have only cellulase activity or may additionally have one or more side activities, i.e. other enzymatic activities in addition to cellulase activity.

By beta-mannosidase is understood one or more enzymes with enzymatic activity of enzyme class EC 3.2.1.25 which catalyses the hydrolysis of terminal, non-reducing beta-D-mannose residues in beta-D-mannosides. A beta-mannosidase may have only beta-mannosidase activity or may additionally have one or more side activities, i.e. other enzymatic activities in addition to beta-mannosidase activity.

By endo-1,3(4)-beta-glucanase is understood one or more enzymes with enzymatic activity of enzyme class EC 3.2.1.6 which catalyses the endohydrolysis of (1->3)- or (1->4)-linkages in beta-D-glucans when the glucose residue whose reducing group is involved in the linkage to be hydrolyzed is itself substituted at C-3. A endo-1,3(4)-beta-glucanase may have only endo-1, 3(4)-beta-glucanase activity or may additionally have one or more side activities, i.e. other enzymatic activities in addition to endo-1,3(4)-beta-glucanase activity.

By beta-mannanase is understood one or more enzymes with enzymatic activity of enzyme class EC 3.2.1.78, also called mannan endo-1, 4-beta-mannosidase, which catalyses random hydrolysis of (1->4)-beta-D-mannosidic linkages in mannans, galactomannans and glucomannans. A beta-mannanase may have only beta-mannanase activity or may additionally have one or more side activities, i.e. other enzymatic activities in addition to beta-mannanase activity.

By beta-glucosidase is understood one or more enzymes with enzymatic activity of enzyme class EC 3.2.1.21, also called amygdalase, beta-D-glucoside glucohydrolase, cellobiase or gentobiase, which catalyses the hydrolysis of terminal, non-reducing beta-D-glucosyl residues with release of beta-D-glucose.

EC (Enzyme Committee) numbers refer to the definition of enzymatic activity and nomenclature given by the Nomenclature Committee of the International Union of Biochemistry and Molecular Biology as in force on 14 Jul. 2017.

Glycosidase may e.g. be in the form of purified enzyme, or a mixture of purified enzymes, or in the form of a crude preparation comprising one or more enzymes, e.g. in the form of a cell extract of a microorganism.

Method

According to the method of the invention, roast coffee beans are extracted with an aqueous liquid. Extraction of coffee beans is well known in the art, e.g. for the production of soluble coffee and any suitable extraction method may be applied. Extraction methods for the production of soluble coffee are well known in the art, e.g. from EP 0826308, and normally involves several extraction steps at increasing temperature. In a preferred embodiment, extraction of roast coffee beans is performed at a temperature of at least 150° C., whereby is meant that the extraction temperature reaches a temperature of at least 150° C. during the extraction although parts of the extraction may be performed at lower temperatures. In another embodiment extraction of roast coffee beans is performed at a temperature below 300° C., whereby is meant that the temperature during extraction at no point has reaches 300° C. or above. The aqueous liquid used for extraction may be any suitable aqueous liquid such as e.g. water and/or coffee extract. The coffee beans being extracted may be whole or ground coffee beans, preferably the coffee beans are ground before extraction.

When the desired degree of extraction has been reached, the extracted roast coffee beans are separated from the extract. The separation may be achieved by any suitable means, e.g. filtration, centrifugation, and/or decanting. In conventional coffee extraction for the production of soluble coffee, the separation is usually achieved by performing the extraction in extraction cells wherein the coffee grounds are retained by filter plates or retainer plates through which the coffee extract can flow. The coffee extract may then be used for any suitable purpose, e.g. for production of soluble coffee, e.g. by drying. In a preferred embodiment, the extracted coffee beans are so-called spent coffee grounds (SGC), i.e. grounds of roast coffee that has gone through extraction to produce soluble coffee.

The separated extracted coffee beans are mixed with an aqueous liquid comprising glycosidase. Glycosidase may be any glycosidase as defined herein, or mixture thereof. Preferred glycosidases of the invention are beta-mannanase, cellulase, beta-mannosidase, endo-1,3(4)-beta-glucanase and beta-glucosidase. In a preferred embodiment, the separated extracted coffee beans are mixed with an aqueous liquid comprising beta-mannanase. In another preferred embodiment, the separated extracted coffee beans are mixed with an aqueous liquid comprising cellulase. In yet another preferred embodiment, the separated extracted coffee beans are mixed with an aqueous liquid comprising beta-glucosidase. In a further preferred embodiment, the separated extracted coffee beans are mixed with an aqueous liquid comprising beta-mannanase and cellulase. In yet a further preferred embodiment the separated extracted coffee beans are mixed with an aqueous liquid comprising beta-mannanase, cellulase and beta-glucosidase. In another embodiment, the separated extracted coffee beans are mixed with an aqueous liquid comprising beta-mannosidase and/or endo-1,3(4)-beta-glucanase. The aqueous liquid is preferably water and may comprise additional components, e.g. component that facilitates the enzymatic hydrolysis such as e.g. salts and buffers. The dry solids content of the mixture of coffee beans and aqueous liquid is preferably between 1% and 50% (weight/weight), more preferably between 2% and 30%, most preferably between 5% and 20%. The glycosidase may be derived from any suitable source. It may e.g. be in the form of an extract of microbial cells comprising the desired enzymatic activities, or it may e.g. be in the form of a mixture of extracts of two or more different microbial cells. Cell extracts may have undergone purification to remove undesired components, e.g. undesired enzymatic activities, and/or to increase the concentration of desired enzymes.

The glycosidase may also be in the form of purified enzymes or may be a mixture of one or more cell extracts and one or more purified enzymes. Suitable glycosidase may e.g. be from a microbial source (bacteria, fungi, yeast) e.g. from *Aspergillus* sp., *Bacillus* sp., *Trichoderma* sp., *Cellulomonas* Sp., *Clostridium* sp., *Penicillium* sp., *Fusarium* sp., *Saccharomyces* sp., *Solanum* sp., *Vibrio* sp., *Streptomyces* sp., *Lactobacillus* sp., and/or *Rhizopus* sp.; from an animal source e.g. from a marine invertebrate (such as scallop), a termite, an insect, a crayfish, a protozoan, a snail, and/or a crustacean; and/or from a plant source, e.g. from marine algae, olives, and/or almonds. A suitable commercial cellulase is e.g. Celluclast 1.5 L from Novozymes A/S, Bagsvaerd, Denmark. A suitable commercial beta-mannanase is e.g. Mannaway 4 L from Novozyrnes A/S, Bagsvaerd, Denmark. A suitable commercial beta-glucosidase is e.g. Amano L (Amano Enzymes, Japan). The concentration of enzymes in the aqueous liquid (the enzymatic activity) and the conditions such as e.g. the temperature and pH should be chosen in such a way as to obtain the desired degree of enzymatic conversion of carbohydrates in the coffee beans.

Such conditions can be chosen and optimised by the skilled person using routine methods and/or utilising knowledge about the enzymes and their optimum conditions of activity.

After the glycosidase has been allowed to react, the aqueous liquid and the extracted coffee beans are separated from the mixture. The extracted coffee beans may be discarded or utilised in any suitable manner. The glycosidase may be allowed to react for any suitable time to obtain the desired degree of enzymatic conversion of carbohydrates in the coffee beans. The time can be chosen and optimised by the skilled person using routine methods and/or utilising knowledge about the enzymes and their optimum conditions of activity. In a preferred embodiment, the glycosidase is allowed to react with the extracted coffee beans until at least 2% by dry weight of the extracted coffee beans has been solubilised.

The aqueous liquid separated from the mixture of aqueous liquid and extracted coffee beans comprises carbohydrates released from the extracted coffee beans by the action of the enzyme, and is used to infuse green coffee beans. The aqueous liquid may be treated so as to inactivate the glycosidase before being used for infusion, e.g. by heat treating the aqueous liquid at a temperature sufficient to inactivate the enzyme. The aqueous liquid may be concentrated, e.g. by evaporation or filtration, to increase the concentration of carbohydrates before infusion of coffee beans. Concentration may e.g. reduce the need for drying of the green beans after infusion and/or enhance the effect of infusion on aroma development during roasting.

The green coffee beans to be infused are preferably whole (not ground) green coffee beans. Infusion may be performed in any suitable way, e.g. by soaking the green coffee beans in the aqueous liquid and/or be spraying the aqueous liquid onto the green coffee beans. The green coffee beans may be left in contact with the aqueous liquid for any suitable time to achieve the desired uptake of liquid in the green coffee beans. In a preferred embodiment the ratio (weight/weight) between aqueous liquid used for infusion and green coffee beans is between 5:1 and 1:10. Infusion may also be performed as quenching during roasting of coffee beans wherein the aqueous liquid is sprayed unto the hot coffee beans to achieve an immediate cooling of the beans.

The infused green coffee beans are roasted. Before roasting the infused green coffee beans may be dried to achieve a desired level of moisture to facilitate the roasting process and/or to achieve the desired microbial stability of the coffee beans. Roasting of green coffee beans is well known in the art of coffee bean processing and any suitable method may be used. Commercial coffee roasting is often performed using paddle and drum roasters of fluidized bed roasters. The degree of roasting may be chosen by the skilled person according to the desired taste and aroma in the final product. Roasting will usually be performed at a temperature where the enzymes will be deactivated, consequently a separate treatment to deactivate the enzymes may usually be omitted.

EXAMPLES

Example 1

A mass of 8.06 kg of wet (12.4% TS) spent coffee grounds freshly obtained from extraction of roast and ground *Robusta* coffee beans with an extraction yield of 59% (w/w) was mixed with 1.94 kg of industrial water in a 15 L Meilibex® reactor (Bex, Switzerland). The slurry was stirred at 30 rpm and incubated at 60° C. for 6 h after addition of 83.08 g of beta-mannanase (Mannaway 4 L, Novozymes Switzerland AG) and 48.6 g of cellulase (Celluclast 1.5 L, Novozymes Switzerland AG). The suspension was subsequently centrifuged on a Sorvall RC 3BP+ (Thermo scientific, Switzerland) for 30 min at 4144 rpm. The supernatant (4 kg) was split in two equal parts and then soaked with either green *Robusta* coffee beans (Vietnam origin) or green *Arabica* coffee beans (Colombian origin) coffee at a 1/1.2 ratio of supernatant/green coffee in plastic bottles of 5 L for 3 h30 at 60° C. on a roller placed in an oven ISF-4-V (Kühner AG, Switzerland) to enable absorption of the hydrolysate in the green beans. Subsequently, treated green beans were dried in a Heraeus VT 6130P vacuum oven (Heraeus, Switzerland) at 60° C. for 22 h. The moisture content of the treated green beans was monitored with a Sinar Bean Pro Moisture Analyzer (Sinar™ Technology, Switzerland) to reach a value <13 g/l.

Roasting of the treated and dried green beans was carried out as follows: *Robusta* treated green beans were roasted for 300 s at 220° C. in a RFS-S Roaster (Neuhaus Neotec, Switzerland) until reaching a color or 120 CTn (Color Test Neuhaus). *Arabica* treated green beans were roasted for 230 s at 220° C. until reaching a color or 120 CTn (Color Test Neuhaus). Untreated *Robusta* and *Arabica* green beans were roasted at 230° C. for 280 s and 275 s, respectively until reaching at color of 120 CTn, for their use as a reference. Roasted coffees were ground at a Ditting Swiss Pos. of 8.5 (corresponding to 2 mm), sieved at 2 mm, vacuum sealed in an aluminium bag and stored at −20° C. until use.

A mass of 50 g of each roast and ground coffee sample (*Arabica* and *Robusta*, treated and untreated) was used to prepare filter coffee with 1 L of Aqua Panna®. Coffee brews were tempered at 65° C. by stirring before pouring them to individual insulated flasks. The participants of a trained sensory panel (8 persons) were served with 40 mL of each sample and they were asked to compare each sample with its reference regarding the aroma, the flavor, and the texture. The results are shown in Table 1 below.

TABLE 1

Result of sensory analysis.

| Coffee type | Robusta | Arabica |
|---|---|---|
| CTN | 120 | 120 |
| Enzymatic Treatment | Mannaway/Celluclast 6 h | Mannaway/Celluclast 6 h |
| Sensory attributes comparison to untreated reference | + Fruity<br>+ Smooth<br>− Intense<br>− Bitter<br>− Burnt<br>− Rubbery | + Acid<br>+ Fruity |

+ indicates increased intensity compared to the reference,
− indicates decreased intensity compared to the reference Example 2

A mass of 5.512 kg of wet (18.15% TS) spent coffee grounds freshly obtained after extraction of roast and ground *Robusta* coffee of Vietnam origin was mixed with 4.493 kg of industrial water in a 15 L Meilibex® reactor (Bex, Switzerland). The slurry was stirred at 30 rpm and incubated at 60° C. for 6 h after addition of 45 g of Amano L (Amano Enzyme Inc. Japan), 50 g of Celluclast 1.5 L (Novozymes, Switzerland AG) and 88 g of β-glucosidase (Biocatalysts, Ltd, UK). The suspension was subsequently centrifuged on a Sorvall RC 3BP+ (Thermo scientific, Switzerland) for 30 min at 5000 rpm. The supernatant (6.336 kg) was split in four equal parts and then soaked with three sets of green *Robusta* beans of different grades (Vietnam origin) and one set of unwashed *Arabica* green beans (Brazilian origin) at a 1/1.2 ratio supernatant/green coffee in plastic bottles of 5 L for 3 h30 at 60° C. on a roller placed in an oven ISF-4-V (Kühner AG, Switzerland) to enable absorption of the hydrolysate in the green beans. Subsequently, treated green beans were dried in a Heraeus VT 6130P vacuum oven (Heraeus, Switzerland) at 60° C. for 22 h. The moisture content of the treated green beans was monitored with a Sinar Bean Pro Moisture Analyzer (Sinar™ Technology, Switzerland) to reach a value <13 g/l.

Roasting of the treated and dried green beans was carried out as follows: *Robusta* treated green beans were roasted between 190 to 350 seconds (depending on the required color) at 230° C. in a RFS-S Roaster (Neuhaus Neotec, Switzerland) until reaching a color of either 90 CTn or 120 CTn (Color Test Neuhaus). *Arabica* treated green beans were roasted between 190 and 370 seconds at 230° C. until reaching a color or 120 CTn (Color Test Neuhaus). Untreated *Robusta* and *Arabica* green beans were roasted respectively at 230° C. for 250 to 360 seconds and at 220° C. for 190 to 300 seconds, until reaching at color of either 90 CTn or 120 CTn, for their use as a reference.

Roasted coffees were ground at a Ditting Swiss Pos. of 8.5 (corresponding to 2 mm), sieved at 2 mm, vacuum sealed in an aluminum bag and stored at −20° C. until use. A mass of 50 g of each roast and ground coffee sample (*Arabica* and *Robusta*, treated and untreated, CTn 90 and CTn 120) was used to prepare filter coffee with 1 L of Aqua Panna®. Coffee brews were tempered at 65° C. by stirring before pouring them to individual insulated flasks. Monadic profiling methodology was applied to this study.

Figure 2:
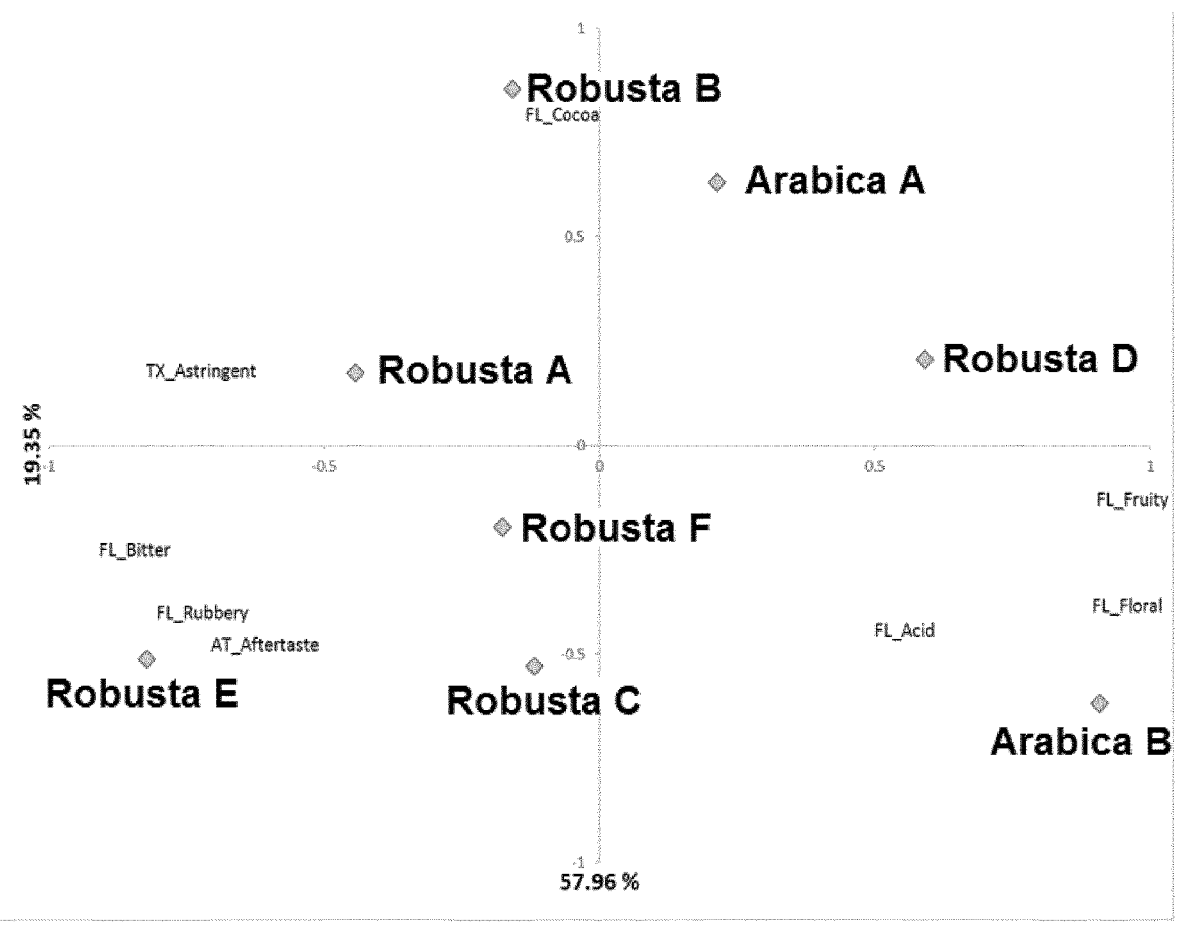
FIG. 2 shows Principal component analysis (PCA) of eight coffee samples (example 2), brewed on a filter at 50 g or Roast & Ground coffee per liter, at CTn 90 corresponding to standard roasting. Arabica A: Unwashed *Arabica*, Brazilian origin, untreated. Arabica B: Unwashed *Arabica*, Brazilian origin, treated. Robusta A: High grade *Robusta*, Vietnam origin, untreated. Robusta B: High grade *Robusta*, Vietnam origin, treated. Robusta C: Medium grade *Robusta*, Vietnam origin, untreated. Robusta D: Medium grade *Robusta*, Vietnam origin, treated. Robusta E: Low grade *Robusta*, Vietnam origin, untreated. Robusta F: Low grade *Robusta*, Vietnam origin, treated. Eight discriminant coffees attributes are represented in this scheme, including with flavors (FL) and aftertaste (AT). The treatment shifted the sensory attributes of all coffees towards more *Arabica*-like notes, including floral, fruity and acidic notes. Results are from example 2.

This is a descriptive sensory methodology where a panel of 15 trained panelists evaluated the intensity (on a 0-10 points scale) of a set of sensory attributes on several products. The participants of the sensory panel from SensoStat (Centre des Sciences du Gout, 9E bd Jeanne d'Arc, 21000 Dijon, France) were served with 40 mL of each sample and they were asked to compare each sample with its reference regarding the flavor and aftertaste. The list of attributes comes from the standard Coffee glossary. Results are shown in FIGS. 1 and 2.

Example 3

A mass of 52.4 g of dry spent coffee grounds (after extraction of roast and ground *Robusta* of Vietnam origin) was mixed with 447.6 g of industrial water in an IKA reactor (Staufen, Germany). The slurry was stirred at 70 rpm and incubated at 50° C. for 16 h after addition of 2 g Rohapect® B1L (AB Enzymes GmbH, Darmstadt, Germany, a fungal pectinase, cellulase and mannanase enzyme preparation (EC 3.2.1.15, EC 3.2.1.4 and EC 3.2.1.78)). The suspension was subsequently centrifuged on a Heraus Multifuge 4KR (Thermo scientific, Switzerland) for 20 min at 4000 rpm, after washing with 2×50 mL of water to recover all reaction mix. The supernatant (399 g) was sieved at 0.5 mm and then soaked with 239.5 g of green *Robusta* coffee beans of Vietnam origin at a 1/1.2 ratio supernatant/green coffee in plastic bottles of 2 L for 4 h at 60° C. on a roller placed in an oven ISF-4-V (Kühner AG, Switzerland) to enable absorption of the hydrolysate in the green beans. Subsequently, treated green beans were dried in a Dorrex kitchen dryer (A. & J. Stöckli AG, Netstal, Switzerland) at 60° C. for 6 h. The moisture content of the treated green beans was monitored with a Sinar Bean Pro Moisture Analyzer (Sinar™ Technology, Switzerland) to reach a value <13 g/l.

Roasting of the green beans was carried out as follows: *Robusta* treated and untreated green beans were roasted for 300 s at 220° C. in a RFS-S Roaster (Neuhaus Neotec, Switzerland). Roasted coffees were ground at a Ditting Swiss Pos. of 8.5 (corresponding to 2 mm), sieved at 2 min, vacuum sealed in an aluminium bag and stored at −20° C. until use.

A mass of 50 g of each roast and ground coffee sample (*Robusta*, treated and untreated) was used to prepare filter coffee with 1 L of Aqua Panna®. Coffee brews were tempered at 65° C. by stirring before pouring them to individual insulated flasks. The participants of the sensory panel from the Nestlé Research Center in Lausanne and the Nestlé Product Technology Center in Orbe, Switzerland (8 persons) were served with 40 mL of each sample and they were asked to compare the sample with its reference regarding the aroma, the flavor, and the texture. Results are shown in Table 2.

TABLE 2

Sensory evaluation of Robusta coffees roasted for 300 s at 220° C. after treatment with the enzymatic hydrolysate from spent coffee grounds, as compared to the untreated reference.

| | |
|---|---|
| Coffee type | Robusta |
| Roasting profile | 220° C. for 300 s |
| Enzymatic Treatment | Rohapect B1L 16 h |
| Sensory attributes comparison to untreated reference | Less earthy |
| | Less woody |
| | Less rubbery |
| | Less intense |

The invention claimed is:

1. A method for producing roast coffee beans, the method comprising:
   a) extracting roast coffee beans with an aqueous liquid;
   b) separating the extracted roast coffee beans of step a) from the extract;
   c) mixing the separated extracted coffee beans of step b) with an aqueous liquid comprising glycosidase;
   d) separating the aqueous liquid and the extracted coffee beans from the mixture of step c), after the glycosidase has been allowed to react;
   e) infusing green coffee beans with the aqueous liquid obtained in step d); and
   f) roasting the infused green coffee beans obtained in step e).

2. The method according to claim 1, wherein the coffee beans being extracted in step a) are ground coffee beans.

3. The method according to claim 1, wherein infusion of green coffee beans in step e) is performed by soaking green coffee beans in the aqueous liquid obtained in step d).

4. The method according to claim 1, wherein infusion of green coffee beans in step e) is performed by spraying the aqueous liquid obtained in step d) unto green coffee beans.

5. The method according to claim 1 further comprising drying the infused green coffee beans after step e) and before step f).

6. The method according to claim 1, wherein extraction in step a) is performed at a temperature of at least 150° C.

7. The method according to claim 1, wherein the glycosidase is allowed to react with the extracted coffee beans until at least 2% by dry weight of the extracted coffee beans has been solubilised.

8. The method according to claim 1, wherein the separated extracted coffee beans of step b) are mixed with an aqueous liquid comprising beta-mannanase in step c).

9. The method according to claim 1, wherein the separated extracted coffee beans of step b) are mixed with an aqueous liquid comprising cellulase in step c).

10. The method according to claim 1, wherein the separated extracted coffee beans of step b) are mixed with an aqueous liquid comprising beta-glucosidase in step c).

11. The method according to claim 1, wherein the separated extracted coffee beans of step b) are mixed with an aqueous liquid comprising beta-mannanase and cellulase in step c).

12. The method according to claim 1, wherein the separated extracted coffee beans of step b) are mixed with an aqueous liquid comprising beta-mannanase, cellulase and beta-glucosidase in step c).

13. The method according to claim 1, wherein the separated extracted coffee beans of step b) are mixed with an aqueous liquid comprising beta-mannosidase in step c).

14. The method according to claim 1, wherein the separated extracted coffee beans of step b) are mixed with an aqueous liquid comprising endo-1,3(4)-beta-glucanase in step c).

15. The method according to claim 1, wherein the aqueous liquid obtained in step d) is concentrated before step e).

\* \* \* \* \*